UNITED STATES PATENT OFFICE.

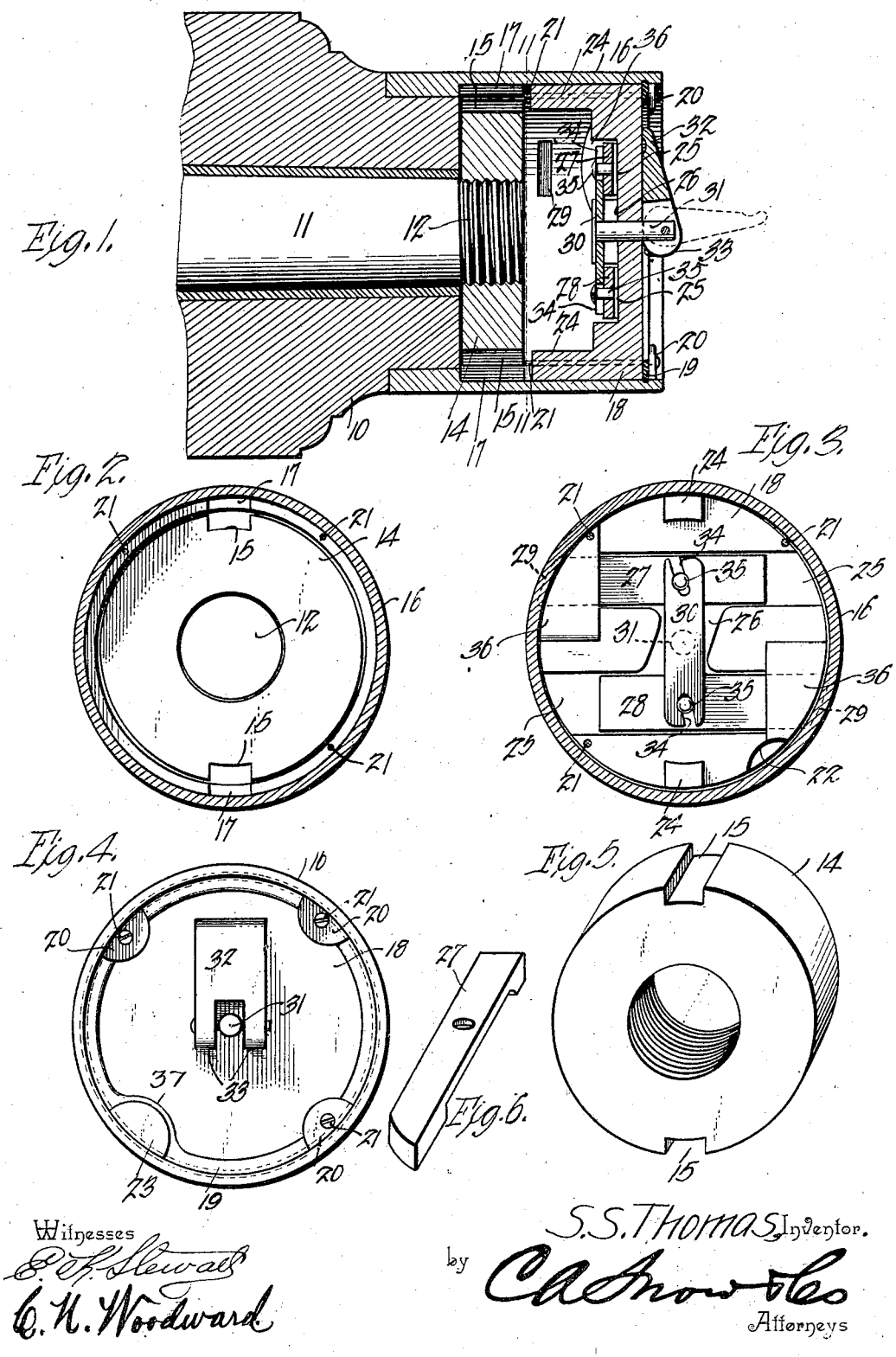

STEPHEN SHERMAN THOMAS, OF RAYVILLE, LOUISIANA.

HUB-ATTACHING DEVICE.

SPECIFICATION forming part of Letters Patent No. 725,298, dated April 14, 1903.

Application filed October 4, 1902. Serial No. 125,989. (No model.)

*To all whom it may concern:*

Be it known that I, STEPHEN SHERMAN THOMAS, a citizen of the United States, residing at Rayville, in the parish of Richland and State of Louisiana, have invented a new and useful Hub-Attaching Device, of which the following is a specification.

This invention relates to vehicle-hubs, and has for its object the production of a simply-constructed and easily-operated device whereby the nut may be removed from the axle-spindle without the use of a hand-wrench or removing the nut from the wheel, the nut being operated both in attaching and detaching it by rotating the wheel to the right or left, as the case may be.

The invention consists in certain novel features of construction, as hereinafter shown and described, and specified in the claims.

In the drawings illustrative of the invention, Figure 1 is a longitudinal sectional view of a portion of a hub and its band and the spindle and its nut with the improvements applied. Fig. 2 is a transverse section on the line II II of Fig. 1 looking toward the hub end of the band. Fig. 3 is a transverse section on the same line looking toward the outer end of the band. Fig. 4 is a front view of the hub-band with the improvement applied. Fig. 5 is a perspective view of the axle-nut detached. Fig. 6 is a perspective view of one of the yieldable latch-bars detached.

The device may be applied to any of the various vehicle-wheels; but for the purpose of illustration the invention is shown applied to a hub 10 of ordinary construction, with the spindle 11 having the threaded end 12, and provided with an axle-nut 14, the latter preferably formed circular in outline and provided with one or more radial recesses 15, as illustrated in Fig. 5.

The hub-band is represented at 16 and attached to the outer end of the hub in the ordinary manner.

The hub-band differs from the ordinary hub-band in that it is formed thicker opposite the axle-nut, as shown, and provided with longitudinal recesses conforming to and adapted to register with the recesses 15 in the nut 14 when the latter is set up in place upon the spindle and in engagement with the hub or in its operative position, as shown in Fig. 2.

Slidably disposed in the hub-band, outside the axle-nut, is a plate 18, closely fitting the thinner portion of the hub-band, as shown. Formed interiorly of the hub-band, near its outer edge, is an annular groove, in which an annular rubber packing-ring 19 is inserted and projecting inward over the plate and with which the latter engages when in its outward position, as shown in Figs. 1 and 4, the plate thus forming an air and moisture tight closure to the outer end of the band.

Projecting inward from the band 16 are a series of lugs 20, preferably formed integral with the band and through which pins 21 are inserted and extended through the plate 18 and into the thicker portion of the band 16, as indicated in Figs. 1 and 2, and thereby forming guides for the plate 18 longitudinally of the band and preventing its rotation therein.

The plate 18 will be provided at one point with a cavity 22, and the hub-band will be provided with an inwardly-extending rib 23, corresponding to the cavity 22, to provide for the removal of the plate from the hub-band after the guide-rods 21 are detached, as will be obvious. By this simple arrangement the plate 18 may be inserted into the hub-band, the yieldable packing-rim 19 and the guide-rods 21 inserted, the plate 18 thereafter being movable longitudinally of the hub-band, but prevented from rotative movement therein by the guide-rods 21, and also adapted when in its outward position to form an airtight closure to the hub-band and effectually preventing the entrance of sand, dust, or moisture.

The inner face of the plate 18 is provided with lugs 24, corresponding to and adapted to engage the registering cavities 15 17 when the plate is depressed, and thus form a locking means between the hub-band and the axle-nut.

When the plate 18 is in its outward position, as shown in Fig. 1, the locking-lugs 24 will be held out of engagement with the nut, so that their presence will not interfere with the ordinary operation of the wheel.

Transversely disposed in the inner face of the plate 18 are guideways or channels 25, connected by a cross-channel 26 centrally of the plate, as indicated in Fig. 3, and within these guideways are disposed latch-bars 27 28, the outer ends of the latch-bars adapted to engage the cavities in the inner face of the hub-band at points opposite the paths of the latch-bars when the plate 18 is in its outward position, while similar cavities will be located in the inner face of the hub-band opposite the paths of the latch-bars when the plate is in its depressed position, one of these latter cavities being indicated at 29 in Fig. 1.

It will be understood that the cavities for the reception of the latch-bars when distended will be located at suitable points in the interior of the hub-band, so that the plate may be locked to the hub-band both in its outward and inward positions.

Connecting the latch-bars 27 28 is a transverse link-band 30, the latter provided with an operating-rod 31, passing outward through the center of the plate 18, as shown in Fig. 1, and provided on its outer end with an operating-lever 32, the operating-lever adapted to fold down into alinement with the outer face of the plate 18 and formed with a cam-surface 33, so that when thus folded down it will draw the rod 31 outwardly, and thus compress the latch-bars 27 forcibly into engagement with the plate, and thus prevent the displacement of the plate or any rattling movement between the plate and hub-band.

The link-bar 30 will be provided in its ends with slots 34, preferably inclined and adapted to engage pins 35, extending from the latch-bar. By this arrangement it will be obvious that the rotation of the pin 31 will cause the link-bar to move the latch-bars back and forth in their recesses 25, so that when the lever 32 is turned outward into alinement with the rod 31 and the rod thereby rotated the latch-bars will be thrown into engagement with the hub-band or withdrawn to release the plate from the hub-band, according as to which direction the operating-lever is turned. After the latch-bars have been moved to the required position they can be firmly locked in place relative to the plate 18 by simply turning the lever 32 over into the position shown in Fig. 1, which not only firmly clamps the latch-bars to the plate, but likewise places the lever 32 in position out of the way of obstructions against which the hub may run. In Fig. 6 one of these latch-bars is shown detached, and it will be noted that it is thinner at the center than at the ends, so that it possesses a certain degree of resiliency to enable it to yield under the pressure of the link-bar 30 when the cam-lever 32 is operated, and thus insure the requisite friction between the parts.

The plate 18 will be provided upon its inner face with bridging portions 36, preferably integral with the plate and forming guides for the latch-bars, as illustrated in Fig. 3. By this simple arrangement when the nut is to be removed the lever-handle 32 is released and turned outward in longitudinal alinement with the rod 31 and the rod 31 rotated to move the latch-bars 27 28 out of engagement with the hub-band, which action releases the plate 18, so that it may be pushed inward to cause the lugs 24 to engage the registering recesses 15 17, and thus lock the nut 14 fast to the hub-band, the axle having been previously propped up to release the wheel from the ground, so that it may be rotated to bring the recesses 15 opposite the recesses 17. The cam-lever 32 is then rotated in the opposite direction to force the latch-bars into engagement with the cavities 29 and again turned downward into alinement with the plate to lock the plate into engagement with the hub-band in its inward position. The wheel is then rotated and the nut 14 turned off from the spindle and the wheel released, the nut being held in position in the hub.

When the wheel is to be replaced, it is only necessary to place it upon the spindle and rotate it until the nut is turned home upon the spindle, release the cam-lever 32, rotate the pin 31 backward to release the latch-bars, draw the plate 18 into its outward position, and again lock it in place, as before noted, which action withdraws the lugs 24 from the cavities 15 17 and releases the nut, as above noted, and at the same time forming a complete air and moisture tight closure across the outer end of the hub-band.

The plate 18, the lugs 24, together with the recesses 25 26, and the keepers or guides 36 will preferably be formed in one piece of malleable iron, while the latch-bars 27 28, the link-bar 30, and the pin 31 will preferably be of steel, but may be of other metal, if preferred, and I do not, therefore, wish to be limited to any specific material or combinations of material for the different parts of the device.

The device may be adapted to any of the various sizes and styles of vehicle-wheels and their hubs.

As many of the cavities 15 17 may be employed as required; but generally two, as shown, will be sufficient.

The packing medium 19 may be of rubber, felt, or other suitable yieldable material, and I do not wish to be limited to the use of any specific material for this purpose.

It will be noted that the slots 34 in the ends of the link-bar 30 are inclined tangentially to the pin 31, which form decreases the friction and reduces the power required to operate the pin 31.

The packing 19 will be somewhat larger than the inner diameter of the groove or seat in the hub-band 16, so that it will be necessary to compress it when inserting it to insure the engagement of the packing in the hub-band with sufficient force to prevent displacement accidentally, while at the same time being sufficiently resilient to yield to the pressure of the plate 18, and thus insure the requisite moisture and sand proof joint not only between the packing and the hub-band, but also between the ring and the plate 18. If required, the packing may be cemented to the hub-band. In this connection it will be obvious that the lugs 20 23 assist in holding the band 19 in position.

The packing-ring 19 will be extended opposite the enlargement 23, as shown at 37, to form a closure to the cavity 23 when the plate 18 is in its outward position.

When the force of the cam-lever 32 33 is exerted upon the transverse link 30 and the central thinner portions of the latch-bars 27 28 compressed or bent toward the inner surface of the plate 18, their outer ends will be tilted inwardly toward the hub, and thus engage the inner surfaces of the apertures 29 and correspondingly move the plate 18 outwardly and cause it to forcibly engage the packing-ring 19 and compress the latter against its seat in the hub-band and beneath the lugs 20 23, and thus form very close, tight, moisture and sand proof joints between the parts.

This is a very important feature of the invention and adds materially to the efficiency of the device, as will be obvious.

The guide-wires 21 may be threaded upon both ends, if desired, the thread upon the outer end larger in diameter than the thread upon the inner end to insure the insertion of the rod from the outside.

The bridging portions 36, in addition to forming guides for the latch-bars 27 28, strengthen and support the latch-bars and prevent their displacement when the tilting action above noted takes place in locking the plate 18 in its outward position. These supports 36 will be especially useful in supporting the latch-bars when the wheel is replaced on the spindle, at which time the nut will generally be moved with some force against the outer end of the spindle, and unless the latch-bars were adequately sustained they would be displaced and the device destroyed. The keepers 36 are therefore an important and valuable addition to the invention and add materially to its efficiency and value.

When the plate 18 is in its outward position, as in Fig. 1, the pins 21 alone hold it from rotative movement relative to the hub, and as the torsional strains are comparatively slight when the parts are in the above-noted positions the pins will be sufficiently strong to hold the plate; but when the plate is moved into engagement with the nut 14 the torsional strains will be greatly increased. Hence the importance of the reinforcing-recesses 17, which transfer the strains from the guide-wires 21 to the reinforced portion of the hub-band, so that in removing the nut from the spindle the strains are borne entirely by the hub-band and the locking-lugs 24. This is an important feature of the invention and materially strengthens the operation of the device, as the weaker parts are thereby relieved from lateral strains and provision made for reinforcing and sustaining the operating means at points where most required and where the heavy strains will occur.

The parts may be modified in minor particulars without affecting the principle of the invention or sacrificing any of its advantages.

Having thus described the invention, what is claimed is—

1. In a hub-fastener, a hub having a hub-band, the axle-spindle, the axle-nut engaging the spindle, a plate slidably disposed in said hub-band, means whereby said plate when depressed is detachably coupled to said axle-nut, spaced latch-bars movably engaging said plate and adapted to engage said hub-band, and means for operating said latch-bars to cause them to be locked into engagement with said hub-band, substantially as described.

2. In a hub-fastener, a hub having a hub-band, the axle-spindle, the axle-nut engaging the spindle, a plate slidably disposed within said hub-band and forming a closure thereto when distended, means whereby said plate when depressed is detachably coupled to said axle-nut, spaced latch-bars movably engaging said plate and adapted when oppositely extended to engage said hub-band, and means for operating said latch-bars, whereby said plate is locked into engagement with said hub-band, substantially as described.

3. In a hub-fastener, a hub having a hub-band, the axle-spindle, the axle-nut engaging the spindle, a plate slidably disposed in said hub-band and held from rotation and forming a closure thereto when distended, means whereby said plate when depressed is detachably coupled to said axle-nut, spaced latch-bars movably engaging said plate, a link-bar movably coupled to said latch-bars and having a pin extending therefrom, and means for rotating said pin, whereby said latch-bars are caused to lock said plate in engagement with said hub-band, substantially as described.

4. In a hub-fastener, a hub having a hub-band, a spindle having an axle-nut, a plate slidably disposed in said hub-band and held from rotation and forming a closure thereto when distended, means whereby said plate when depressed is detachably coupled to said axle-nut, yieldable latch-bars spaced apart and movably disposed relative to said plate, a link-bar movably coupling said latch-bars and having an operating-pin extending therefrom, and means for moving said pin rotatively and longitudinally, whereby said latch-bars will be forcibly engaged with the hub-band and likewise compressed into forcible engagement with said plate, substantially as described.

5. In a hub-fastener, a hub having a hub-band, the axle-spindle, the axle-nut engaging the spindle and having one or more radial recesses, a plate slidably disposed within said hub-band and held from rotation therein and having lugs adapted to engage said recesses when the plate is depressed, a yieldable annular packing with which said plate engages when in its outward position, and means carried by said plate for locking said plate to said hub-band and forcibly compressing it into engagement with said packing, substantially as described.

6. In a hub-fastener, a hub having a hub-band, the axle-spindle having an axle-nut, a plate slidably disposed in said hub-band and held from rotation therein and having transverse spaced recesses, latch-bars movably engaging said recesses, a link-bar movably coupling said latch-bars and provided with an operating-pin extending therefrom, means for actuating said operating-pin to cause said latch-bars to be distended into engagement with said hub-band, and means carried by said plate for detachably coupling it when depressed, to said axle-nut, substantially as described.

7. In a hub-fastener, the hub having a hub-band, the axle-spindle, the axle-nut engaging said spindle, a plate slidably disposed in said hub-band and held from turning therein, means whereby said plate when depressed is detachably coupled to said nut, yieldable latch-bars spaced apart and movably engaging said plate on one side, a link-bar movably coupled to said latch-bars and having a pin extending therefrom through said plate, an operating-lever coupled to said pin on the opposite side of said plate and having a cam-surface adapted when said lever is operated to compress said latch-bars into engagement with said plate and also lock said plate into engagement with said hub-band, substantially as described.

8. In a hub-fastener, the hub having a hub-band provided with one or more longitudinal interior recesses, the axle-spindle, the axle-nut engaging the spindle and having radial recesses corresponding to and adapted to register with the recesses in the hub-band, a plate slidably disposed within said hub-band and adapted to form a closure to said hub-band when extended and provided with lugs adapted when said plate is depressed to engage said registering recesses and thereby couple said axle-nut to the hub, substantially as described.

9. In a hub-fastener, the hub having a hub-band provided with one or more longitudinal interior recesses, the axle-spindle, the axle-nut engaging the spindle and having radial recesses corresponding to and adapted to register with the recesses in the hub-band, a plate slidably disposed within said hub-band and adapted to form a closure to said hub-band when extended and provided with lugs adapted when said plate is depressed to engage said registering recesses and thereby couple said axle-nut to the hub, and means operative outside the hub for locking said plate in its distended position, substantially as described.

10. In a hub-fastener, the hub, the axle-spindle, the axle-nut engaging the spindle, a hub-band engaging the hub and provided with longitudinally-disposed spaced guide-pins, a plate disposed within said hub-band and slidably engaging said guide-pins, means whereby said plate when depressed is detachably coupled to said nut, and means carried by said plate for locking it into engagement with said hub-band, substantially as described.

11. In a hub-fastener, the hub, the axle-spindle, the axle-nut engaging the spindle, a hub-band engaging the hub and provided with spaced lugs, guide-pins engaging said lugs and connected to said band, a plate disposed within said hub-band and slidably engaging said guide-pins, means whereby said plate when depressed is detachably coupled to said nut, and means carried by said plate for locking it into engagement with said hub-band, substantially as described.

12. In a hub-fastener, the hub, the axle-spindle having the axle-nut engaged therewith, a hub-band engaging the hub and provided with spaced lugs, guide-pins engaging said lugs and connected to said band, a plate disposed within said hub and slidably engaging said guide-pins, means whereby said plate when depressed is detachably coupled to said nut, an annular packing-ring between said lugs and said plate and with which said plate is adapted to be engaged when extended, and means whereby said plate when extended is locked into engagement with said hub-band, substantially as described.

13. A hub-fastener consisting of a plate disposed longitudinally movable relative to the hub and axle, means carried by said plate for detachably engaging the axle-nut when depressed, spaced latch-bars movably engaging said plate and adapted when distended to lock the plate into engagement with the hub, substantially as described.

14. A hub-fastener consisting of a plate disposed longitudinally movable relative to the hub and axle and connected to rotate with the hub, means carried by said plate for detachably engaging it when depressed to the axle-nut, spaced latch-bars movably engaging said plate, and means operative outside the hub for forcibly moving said latch-bars alternately in opposite directions into engagement with and disengagement from the hub, substantially as described.

15. A hub-fastener consisting of a plate disposed longitudinally movable relative to the hub and axle and connected to rotate with the hub and adapted when distended to form a closure to the outer end of the hub, means carried by said plate for detachably engaging the axle-nut when depressed, spaced latch-bars movably engaging said plate and adapted when distended to lock said plate into engagement with the hub, substantially as described.

In testimony that I claim the foregoing as my own I have hereto affixed my signature in the presence of two witnesses.

STEPHEN SHERMAN THOMAS.

Witnesses:
CAREY J. ELLIS,
J. A. HICKS.